United States Patent [19]
Ma et al.

[11] Patent Number: 5,926,649
[45] Date of Patent: Jul. 20, 1999

[54] MEDIA SERVER FOR STORAGE AND RETRIEVAL OF VOLUMINOUS MULTIMEDIA DATA

[75] Inventors: Gin-Kou Ma, Hsinchu; Chiung-Shien Wu, Kaohsiung; Muh-Rong Yang, Taipei, all of Taiwan

[73] Assignee: Industrial Technology Research Institute, Taiwan

[21] Appl. No.: 08/736,215

[22] Filed: Oct. 23, 1996

[51] Int. Cl.⁶ .................................................. G06F 13/37
[52] U.S. Cl. .......................... 395/826; 711/111; 711/202; 711/216
[58] Field of Search ................................... 711/202, 216, 711/4, 111–114; 348/7; 395/826

[56] References Cited

U.S. PATENT DOCUMENTS

| | | | |
|---|---|---|---|
| 5,463,758 | 10/1995 | Otteson | 711/114 |
| 5,473,362 | 12/1995 | Fitzgerald et al. | 348/7 |
| 5,510,905 | 4/1996 | Birk | 386/125 |
| 5,579,501 | 11/1996 | Lipton et al. | 711/216 |
| 5,649,093 | 7/1997 | Hanko et al. | 395/182.04 |
| 5,678,061 | 10/1997 | Morad | 395/841 |
| 5,708,769 | 1/1998 | Stallmo | 395/182.04 |
| 5,724,583 | 3/1998 | Carmon et al. | 395/650 |
| 5,732,239 | 3/1998 | Tobagi et al. | 395/826 |

OTHER PUBLICATIONS

Cormen, Thomas H et al. Introduction to Algorithms Cambridge: MIT Press, 1990 pp. 221–228 and 235–237.

Reddy et al. "Io Issues in a Multimedia System," IEEE Computer, pp. 69–74, Mar. 1994.
Anderson et al. "A File System for Continuous Media," ACM Trans. on Computer Systems, pp. 311–337, Nov. 1992.
Vin, H.M. et al. "Designing a Multi–User HDTV Storage Server," IEEE J. Selected Areas in Comm. pp. 153–164, Jan. 1993.

*Primary Examiner*—Daniel H. Pan
*Assistant Examiner*—Jeffrey Allen Rossi
*Attorney, Agent, or Firm*—Proskauer Rose LLP

[57] ABSTRACT

A method and apparatus for storage and retrieval of multiple data streams in a multimedia distribution system. A given data stream is separated into a plurality of portions, and the portions are stored in a multi-disk storage system with Y disks each having X zones such that the ith portion of the given stream is stored in zone (i mod X) of disk (i mod Y). The number X of zones per disk and the number Y of disks are selected as relatively prime numbers. The stored data are retrieved using Y independent retrieval schedulers which are circulated among the Y disks over a number of scheduling intervals. Each retrieval scheduler processes multiple requests separated into X groups, with the requests of each group accessing the same disk zone during a given scheduling interval. The retrieval schedulers are also configured such that the retrieval requests of a given retrieval scheduler access the same disk during a given scheduling interval. The data stream placement technique in conjunction with the retrieval schedulers provide sequential-like parallel retrieval suitable for supporting real-time multimedia data distribution for large numbers of clients.

16 Claims, 4 Drawing Sheets

FIG. 1A
(PRIOR ART)

ROUND-ROBIN

MAXIMUM TIME BETWEEN RETRIEVAL

FIG. 1B
(PRIOR ART)

SCAN (ELEVATOR)

MAXIMUM TIME BETWEEN RETRIEVAL

FIG. 1C
(PRIOR ART)

SUB-GROUPING

MAXIMUM TIME BETWEEN RETRIEVAL

| r_scheduler | GROUP | \<DISK, ZONE\> ACCESS BY TIME PERIOD | | | | | | | | | | |
|---|---|---|---|---|---|---|---|---|---|---|---|---|
| | | $T_0$ | $T_1$ | $T_2$ | $T_3$ | $T_4$ | $T_5$ | $T_6$ | $T_7$ | $T_8$ | $T_9$ | ... |
| $R_0$ | 0 | <0,0> | <1,1> | <2,2> | <0,3> | <1,0> | <2,1> | <0,2> | <1,3> | <2,0> | <0,1> | ... |
| | 1 | <0,1> | <1,2> | <2,3> | <0,0> | <1,1> | <2,2> | <0,3> | <1,0> | <2,1> | <0,2> | ... |
| | 2 | <0,2> | <1,3> | <2,0> | <0,1> | <1,2> | <2,3> | <0,0> | <1,1> | <2,2> | <0,3> | ... |
| | 3 | <0,3> | <1,0> | <2,1> | <0,2> | <1,3> | <2,0> | <0,1> | <1,2> | <2,3> | <0,0> | ... |
| $R_1$ | 4 | <1,1> | <2,2> | <0,3> | <1,0> | <2,1> | <0,2> | <1,3> | <2,0> | <0,1> | <1,2> | ... |
| | 5 | <1,2> | <2,3> | <0,0> | <1,1> | <2,2> | <0,3> | <1,0> | <2,1> | <0,2> | <1,3> | ... |
| | 6 | <1,3> | <2,0> | <0,1> | <1,2> | <2,3> | <0,0> | <1,1> | <2,2> | <0,3> | <1,0> | ... |
| | 7 | <1,0> | <2,1> | <0,2> | <1,3> | <2,0> | <0,1> | <1,2> | <2,3> | <0,0> | <1,1> | ... |
| $R_2$ | 8 | <2,2> | <0,3> | <1,0> | <2,1> | <0,2> | <1,3> | <2,0> | <0,1> | <1,2> | <2,3> | ... |
| | 9 | <2,3> | <0,0> | <1,1> | <2,2> | <0,3> | <1,0> | <2,1> | <0,2> | <1,3> | <2,0> | ... |
| | 10 | <2,0> | <0,1> | <1,2> | <2,3> | <0,0> | <1,1> | <2,2> | <0,3> | <1,0> | <2,1> | ... |
| | 11 | <2,1> | <0,2> | <1,3> | <2,0> | <0,1> | <1,2> | <2,3> | <0,0> | <1,1> | <2,2> | ... |

…

MEDIA SERVER FOR STORAGE AND RETRIEVAL OF VOLUMINOUS MULTIMEDIA DATA

RELATED APPLICATIONS

"This application is a continuation-in-part of U.S. Pat. No. 5,771,234 to Chiung-Shien Wu and Gin-Kou Ma, filed on Dec. 5, 1995."

The subject matter of the present application is related to the subject matter of U.S. patent application Ser. No. 08/736,216 of Chiung-Shien Wu, Gin-Kou Ma and Muh-Rong Yang filed concurrently herewith and entitled "A Scalable Architecture for Media-On-Demand Servers," and U.S. patent application Ser. No. 08/657,739 now U.S. Pat. No. 5,742,443 of Shiao-Li Tsao, Yueh-Min Huang, Eric Lee and Yih-Woei Liang filed May 31, 1996 and entitled "Improved Method of Data Placement of Continuous Media to Utilize Bandwidth Efficiency," both of which are assigned to the present assignee and incorporated by reference herein.

FIELD OF THE INVENTION

The present invention relates to media-on-demand systems in which stored multimedia comprising multiple digital bit streams can be retrieved on a real-time basis by a media server. More particularly, the invention relates to multimedia data storage and retrieval techniques particularly well-suited for use in a media server which must retrieve large amounts of multimedia data in response to multiple simultaneous requests.

BACKGROUND OF THE INVENTION

Media server design is an important aspect of the ongoing effort to provide widespread availability of interactive multimedia services such as video-on-demand (VOD), teleshopping, digital video broadcasting and distance learning. A media server retrieves digital multimedia bit streams from storage devices and delivers the streams to clients at an appropriate delivery rate. The multimedia bit streams represent video, audio and other types of data, and each stream may be delivered subject to quality-of-service (QOS) constraints such as average bit rate or maximum delay jitter. An important performance criteria for a media server and its corresponding multimedia delivery system is the maximum number of multimedia streams, and thus the number of clients, that can be simultaneously supported.

The data retrieval method used in a given media server is a significant limitation on the stream delivery capability of that server. Disk-based storage devices are generally subject to mechanical delays due to disk seeking time, disk start-up and settle time, and disk rotation speed. The effect of certain of these mechanical delays on server stream delivery capability may be alleviated by providing parallel access to multiple storage devices as in the conventional Redundant Array of Inexpensive Disks (RAID) system. However, the performance of these and other parallel access retrieval techniques remains limited by the use of random access file placement as well as unavoidable overhead such as disk seeking time and Small Computer System Interface (SCSI) bus contention. For additional details on the performance of parallel access techniques, see C. S. Wu et al., "Performance Evaluation of a Disk Array for Video-on-Demand Systems," Conference Proceedings, 10th International Conference on Information Networking (ICOIN-10), Kyung-Ju, Korea, 1996, pp. 351–356, which is incorporated by reference herein. The use of sequential access file placement in place of random access placement can improve retrieved data throughput by a factor of two or more for relatively small numbers of clients. However, when a large number of clients simultaneously access the server, sequential access techniques perform substantially like random access techniques due to interleaving of multiple retrieval requests.

Reductions in disk seeking overhead may be achieved by careful design of disk scheduling, request admission control and media data placement. A number of disk scheduling algorithms are known in the art, including first-come first-served, shortest seek time first and scan or elevator algorithms. Although useful in reducing seek time, reducing rotational latency, increasing throughput and providing fair access, these scheduling algorithms generally cannot satisfy real-time video performance constraints. For example, an exemplary scan or elevator algorithm scans the disk head back and forth to limit backtracking and significantly reduce seek time. However, video files generally exhibit little locality between disk access locations for different streams, and the probability of two or more clients accessing the same media stream within a short time period is very difficult to predict. Scan algorithms therefore generally cannot satisfy real-time constraints.

A known disk scheduling algorithm suitable for real-time scheduling of tasks with deadlines is the earliest deadline first (EDF) algorithm. However, application of this algorithm to video files is likely to introduce excessive seek time and rotational latency and yield poor server resource utilization. A scan-EDF algorithm has been proposed for real-time applications in A. L. Narasimha Reddy and J. C. Wyllie, "I/O Issues in a Multimedia System," IEEE Computer, pp. 69–74, March 1994, which is incorporated by reference herein. The scan-EDF algorithm services requests with earliest deadlines first. When many requests have the same or similar deadlines, as is characteristic of video-on-demand and other interactive multimedia systems, the corresponding data blocks are essentially accessed using the above-described scan algorithm only.

Figure 1A:
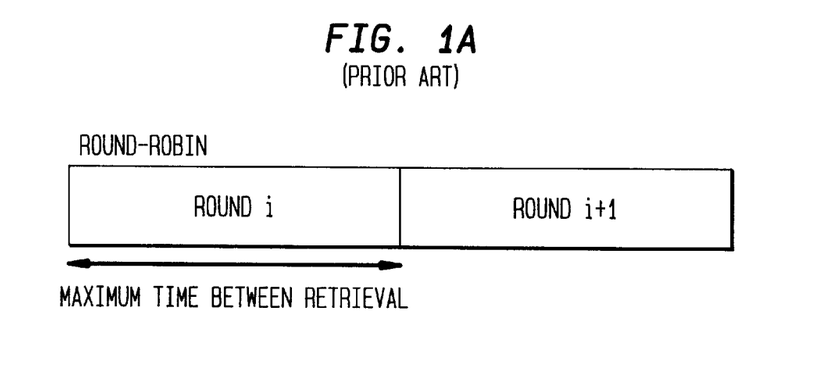
FIGS. 1A, 1B and 1C illustrate the trade-off between round length and maximum time between same-stream retrievals for a number of conventional disk scheduling algorithms.
Figure 1B:
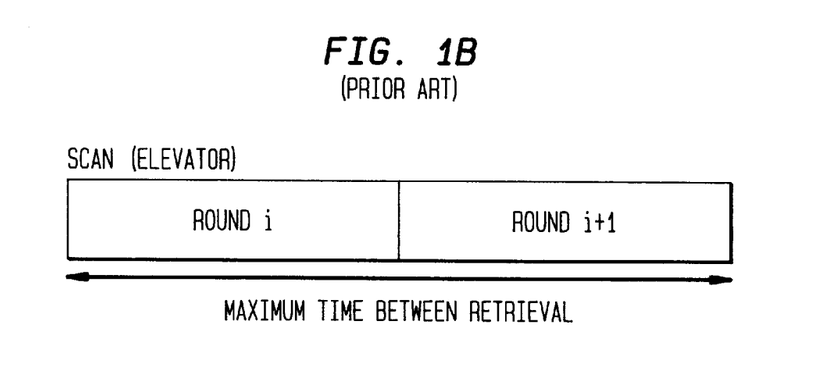
Figure 1C:
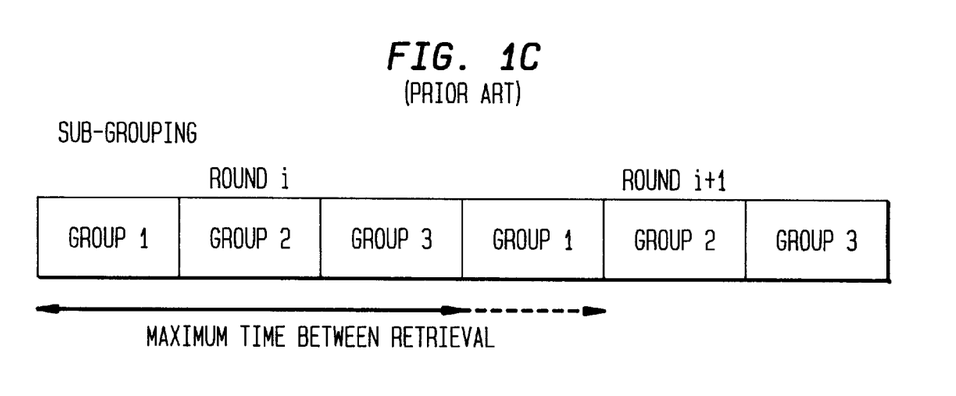

FIGS. 1A, 1B and 1C illustrate the relative round length and maximum time between retrievals for a number of different disk scheduling algorithms. A "round" refers to a series of retrievals during which a block sequence of arbitrary length is retrieved for each currently-requested media stream. The use of rounds is particularly important in meeting the real-time constraints of interactive multimedia systems. FIG. 1A illustrates exemplary round lengths and maximum time between same-stream retrievals for successive rounds of a round-robin algorithm. The round-robin algorithm services the requested streams in a fixed order in every round. The first stream retrieved in round i is therefore also the first stream retrieved in round i+1. The maximum latency between retrieval times of successive requests of a given stream is bounded by the period of a single round, as shown in FIG. 1A. A server utilizing a round-robin algorithm therefore need only include enough buffer space to satisfy data consumption for one round. A major drawback of the round-robin scheduling algorithm is that it does not exploit the relative positions of media blocks being retrieved during a given round, and an unusual sequence in each round can yield an unpredictably long seek latency. This underscores the importance of considering data placement algorithms in conjunction with the disk scheduling algorithms.

FIG. 1B illustrates successive rounds and maximum time between same-stream retrieval for a scan or elevator algorithm. The scan algorithm generally services a stream in an order which depends on the relative placement of the media blocks being retrieved. A given stream may therefore be serviced at the beginning of one round and at the end of the next round, resulting in the maximum retrieval latency of nearly two full round periods as illustrated. Compared to the round-robin algorithm, the rounds are shorter in the scan algorithm but latency between successive same-stream retrievals may be longer. In addition, a server utilizing the scan algorithm generally requires enough buffer space to satisfy data consumption for nearly two rounds.

FIG. 1C illustrates successive rounds and maximum time between same-stream retrieval for a sub-grouping algorithm. The sub-grouping algorithm partitions each round into groups, and assigns each requested stream to one of the groups. The groups are then serviced in a fixed order in each round, while a scan algorithm is used to service the particular streams within each group. If all of the requested streams are assigned to the same group, the sub-grouping algorithm reduces to the scan algorithm. If each requested stream is assigned to its own unique group, the sub-grouping algorithm reduces to the round-robin algorithm. The maximum time between retrieval is thus between a single round period and the single round period plus nearly one additional group time. For example, a given stream assigned to Group 1 may be serviced in accordance with the scan algorithm at the beginning of Group 1 in round i but at the end of Group 1 in round i+1. The sub-grouping algorithm generally produces a round length greater than that of the scan algorithm but less than that of the round-robin algorithm, and a maximum retrieval latency less than that of the scan algorithm but slightly greater than that of the round-robin algorithm.

The round-based processing of FIGS. 1A through 1C are designed to allow a media server to meet real-time constraints. In order to prevent "starvation" of a client requesting a particular stream, it may also be desirable for a scheduling algorithm to have the buffer-conserving property described in D. J. Gemmell and J. Han, "Multimedia Network File Servers: Multichannel Delay Sensitive Data Retrieval," ACM Multimedia Systems, pp. 240–252, April 1994, which is incorporated by reference herein. The buffer-conserving property is also referred to as work-ahead-augmenting in D. Anderson, Y. Osawa, and R. Govindan, "A File System for Continuous Media," ACM Trans. on Computer Systems, pp. 311–337, November 1992, which is also incorporated by reference herein. The buffer-conserving property is a sufficient condition for preventing the starvation condition which results when a client requesting a particular stream is not delivered sufficient stream data to satisfy real-time constraints. A scheduling algorithm has the buffer-conserving property if the data retrieval rate is prevented from lagging the consumption rate and there is never a net decrease in the amount of buffered data on a round-by-round basis. It may also be necessary to prefetch sufficient stream data to meet the consumption requirements of the longest possible round. Since the round length depends on the number of blocks retrieved for each requested stream, the round length can be minimized if the number of blocks retrieved for a given stream during each round is proportional to the consumption rate of that stream. A non buffer-conserving scheduling algorithm, which is generally more complex, allows the data retrieval rate to fall behind the consumption rate in one round but compensates for the shortfall in a later round.

Admission control is an another important factor in media server design. A media server must determine when new data delivery requests can be accommodated by the system while maintaining desired quality-of-service (QOS) levels for all requests. In accordance with the above-described disk scheduling algorithms, accepting a new request will increase the length of a service round, and may prevent the server from providing an agreed-upon QOS to a current client. A typical media server may offer three broad quality-of-service (QOS) classes: (i) deterministic, in which all data delivery deadlines are guaranteed to be met; (ii) statistical, in which deadlines are guaranteed to be met with a certain probability; and (iii) best-effort, in which no guarantees are given for meeting deadlines. For deterministic services, resources may be reserved in worst-case fashion for each requested multimedia stream. The server may also check whether buffering for existing streams is adequate to prevent starvation of any client before admitting another service request and increasing the length of a service round, as described in greater detail in the D. Anderson et al. reference cited above and in H. M. Vin and P. Venkat Rangan, "Designing a Multi-User HDTV Storage Server," IEEE J. Selected Areas in Comm., pp. 153–164, January 1993, which is incorporated by reference herein.

For statistical services, the server generally computes the change to round length based on statistical values. The server may also drop media blocks, dynamically vary media resolution levels or use other strategies to resolve a missed deadline. Maximum usage of limited data retrieval resources may be achieved subject to QOS commitments using an algorithm that dynamically calculates real-time requirements and carefully lengthens round duration to admit new requests. One such algorithm is described in greater detail in C. S. Wu et al., "On Scalable Design of an ATM-based Video Server," IEEE International Conference on Communications, 1996 (SUPERCOMM/ICC '96), paper no. 44-1, which is incorporated by reference herein.

Media data placement techniques are another important factor in media server design and are particularly useful for reducing disk seeking overhead. A given media bit stream can be stored contiguously or split up into separate portions which are "scattered" into separate disks and disk zones of a disk-based storage device. Contiguous storage is relatively simple to implement but the stored streams are subject to fragmentation when the end of a disk or disk zone is reached before the full stream is stored. In contrast, scattered placements avoid fragmentation and corresponding copying overheads. The decision as to whether to utilize contiguous storage or scattered storage may be based on an analysis of intrastream seeks. Retrieving a contiguously-stored bit stream requires only one seek to position a disk head at the start of the stream. On the other hand, retrieving several blocks of a scattered bit stream may require a separate seek for each block read. Even when retrieving a relatively small amount of data, it is possible that part of the data might be stored in one block and the rest in the next block, such that an intrastream seek is required.

Intrastream seeks can be avoided to some extent in scattered storage by designing the scheduling algorithm such that the amount of data read for a given stream always fits within a single block. This could be provided by, for example, selecting a sufficiently large block size and reading one block of the given stream in each round. However, if more than one block is required to prevent starvation prior to the next round, an intrastream seek may be unavoidable. The effects of intrastream seeks may be alleviated through the use of constrained placement techniques which limit the separation between successive stream blocks. Although such techniques are attractive when the block size must be small, additional complexities are required to ensure that separation between blocks conforms to the required constraints, and the scheduling algorithm may need to be modified to retrieve all blocks for a given stream before switching to any other stream.

In a situation in which an entire media stream is stored on a single disk of a disk-based storage device, the number of concurrent accesses to that media stream is limited. Scattered storage overcomes this limitation by using techniques such as stream stripping and stream interleaving. A stream stripping technique utilized in the above-noted RAID system "strips" a given media stream by separating it into distinct portions, and stores the portions across an array of disks such that parallel access can be achieved. One block of each stream may then be retrieved from each disk in each round, in accordance with the above-described scheduling algorithms. If a multiple-disk set of the storage device is spindle synchronized and operated in a lock-step parallel mode, different physical sectors of each disk can be accessed in parallel as a single large logical sector. Because accesses are performed in parallel, logical sector blocks and physical sector blocks will generally have identical access times. The data retrieval throughput therefore increases as a function of the number of disks involved. In a single disk configuration, data retrieval throughput can be improved by increasing the size of the physical sector blocks. However, the block size cannot be increased in an unlimited manner since this would unduly increase the logical sector block size and consequently lengthen startup delays and enlarge the buffer space requirements for each stream.

Stream interleaving techniques generally involve interleaving blocks across the disk array for storage. A simple interleaving pattern stores the blocks cyclically across the disk array with successive stream blocks stored on different disks. The disks of the disk array are not spindle synchronized and can therefore operate independently. At least two different stream retrieval methods may be used with the stream interleaving storage technique. One retrieval method is similar to that used with the stripping storage described above where one block is retrieved from each disk in every round. This method ensures a balanced retrieval load but generally requires more buffer space. The other retrieval method retrieves blocks from one of the disks for a given requested stream in each round, such that the stream retrievals are interleaved rather than simultaneous. The retrieval load for each round is balanced across the disks to maximize the throughput. The load can be balanced by interleaving the streams such that all streams have the same round length but each stream considers the round to begin at a different time.

It can be seen from the above-described description of conventional media placement techniques that contiguous placement techniques limit the number of simultaneously-requested streams and therefore the number of clients in a multimedia delivery system. Although scattering techniques can increase the data retrieval throughput by introducing concurrent access, the seek latency is increased and factors such as load balancing and buffer management introduce additional complexity in the throughput maximization process. Furthermore, known scattering techniques generally need to store a complicated table-based mapping to keep track of the disk zone or zones in which portions of a particular stored data stream are located. Conventional data placement techniques are thus unable to provide a high throughput multimedia delivery system capable of simultaneously servicing a large number of clients.

A number of other prior art techniques are described in U.S. Pat. No. 5,519,435 issued May 21, 1996 to M. H. Anderson, assigned to Micropolis Corp. and entitled "Multi-user, On-Demand Video Storage and Retrieval System Including Video Signature Computation for Preventing Excessive Instantaneous Server Data Rate," U.S. Pat. No. 5,510,905 issued Apr. 23, 1996 to Yitzhak Birk and entitled "Video Storage Server Using Track-Pairing," U.S. Pat. No. 5,517,652 issued May 14, 1996 to Takanori Miyamoto et al., assigned to Hitachi Ltd. and entitled "Multi-media Server for Treating Multi-media Information and Communication System Employing the Multi-media Server," and U.S. Pat. No. 5,473,362 issued Dec. 5, 1995 to R. P. Fitzgerald et al., assigned to Microsoft Corp. and entitled "Video on Demand System Comprising Stripped Data Across Plural Storable Devices With Multiplex Scheduling." These references generally utilize data stripping methods to store the multimedia data streams in a manner that facilitates media-on-demand services. However, the resulting improvement in data stream throughput remains substantially limited due to unavoidable mechanical delays in the disk-based storage system. These limitations are described in greater detail in, for example, C. S. Wu et al., "Performance Evaluation of a Disk Array for Video-on-Demand Systems," Proceedings of 10th International Conference of Information Networking (ICOIN-10), Kyung-Ju, Korea, 1996, pp. 351–356, which is incorporated by reference herein.

As is apparent from the above, a need exists for an improved media server which maximizes the number of simultaneously-supported multimedia streams. The media server should support sequential-like parallel retrieval capabilities while maintaining a desired data delivery bandwidth, reducing seek latency and avoiding the complicated table-based mapping and other problems associated with conventional data placement and retrieval techniques.

SUMMARY OF THE INVENTION

The present invention provides a media server suitable for storing and retrieving multimedia data in one or more disk-based storage devices. Video streams or other types of data to be stored are separated or "stripped" into portions and the portions are stored or "scattered" on disks of the storage system in a predetermined order. A multiple retrieval-schedulertechnique is used to provide sequential-like parallel retrieval of the stored streams. The media server can simultaneously retrieve and deliver numerous media streams to thereby provide multimedia data delivery to a large number of clients.

One aspect of the present invention is directed to a method for storing data in a multiple-disk storage device which includes Y disks, each of which have X zones. The numbers X and Y are selected to be relatively prime, that is, having no common factors greater than 1. Each of the zones may provide a substantially equal amount of data storage. A number of data streams which may represent MPEG-2 video or other types of data are stored by a media server in the Y disks of the disk-based storage device. The server separates a given data stream into a plurality of portions, and stores an ith portion of the given stream on a disk determined as a function of (i mod Y) and in a zone of that disk determined as a function of (i mod X). For example, the ith portion may be stored directly in zone (i mod X) of disk (i mod Y) or may be stored in zone (i mod X+Z1) of disk (i mod Y+Y1) where Z1 and Y1 represent initial zone and disk offsets, respectively. The data placement technique of the present invention ensures that any subsequent data retrieval may be provided in a sequential-like order and that the maximum search distance occurs only when crossing zones. A substantial reduction in disk seek time is thereby provided and an approximate average data delivery bandwidth can be maintained for a large number of clients.

Another aspect of the invention relates to a data retrieval technique in which Y independent retrieval schedulers are used to retrieve data streams stored on the Y disks in the manner previously described. The Y independent retrieval schedulers are circulated among the Y disks over a number of scheduling intervals. Each retrieval scheduler processes multiple retrieval requests separated into X groups, with the retrieval requests of a given group accessing the same disk zone during a given scheduling interval. The retrieval schedulers are also configured such that all of the retrieval requests of a given retrieval scheduler access the same disk during a given scheduling interval. The data stream placement technique in conjunction with the retrieval schedulers provide sequential-like parallel retrieval suitable for supporting real-time multimedia data distribution for large numbers of clients.

These and other features and advantages of the present invention will become more apparent from the accompanying drawings and the following detailed description.

BRIEF DESCRIPTION OF THE DRAWINGS

FIG. 5 is a diagram illustrating exemplary retrieval schedulers in accordance with the present invention.

DETAILED DESCRIPTION OF THE INVENTION

The present invention will be illustrated below in an exemplary media server application which delivers multimedia data streams to subscribers via an access network. It should be understood, however, that the described techniques are more generally applicable to any other data storage and retrieval application in which multiple data streams are simultaneously retrieved from disk-based media by a server and delivered to one or more clients. The term "server" as used herein should be understood to include a computer, application-specific integrated circuit (ASIC), microprocessor or any other digital data processor capable of carrying out the described data storage and retrieval processes. The term "client" should be understood to include a subscriber to a multimedia distribution system, or any other user or terminal of a computer network, cable network, telephone network or other type of data distribution network.

Figure 2:
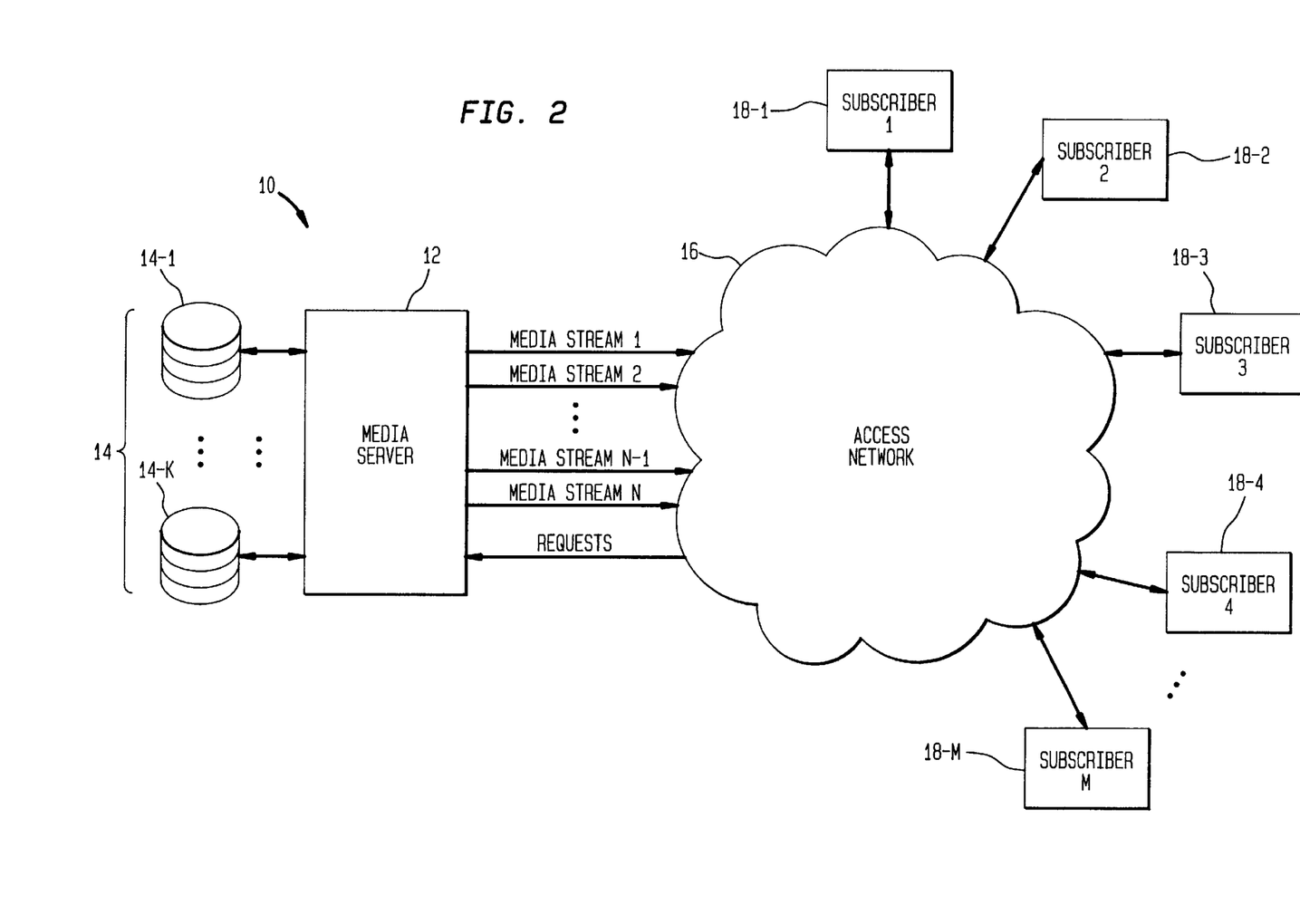
FIG. 2 is a block diagram of an exemplary interactive multimedia data delivery system in which a media server in accordance with the present invention may be utilized.

FIG. 2 shows an exemplary multimedia data delivery system 10 which includes a media server 12 coupled to a disk-based storage subsystem 14. The storage subsystem 14 includes a number of disk-based storage devices 14-i, i=1, 2, . . . K, each of which may include multiple disks. The media server 12 is operative to store 10 data to and retrieve data from the disk-based storage devices 14-i in a manner to be described in greater detail below. The disk-based storage devices 14-i may represent magnetic, optical, magneto-optical or other types of single-disk or multiple-disk drives as well as various combinations thereof. The media server 12 retrieves a number N of multimedia data streams from the disk-based storage subsystem 14 and delivers the retrieved streams via an access network 16 to one or more of a plurality of subscribers 18-i, i=1, 2, . . . M of the multimedia data delivery system 10. The media server retrieves and delivers the streams in response to requests transmitted by the subscribers 18-i to the server 12 via the access network 16. The subscribers 18-i may be more generally referred to herein as clients.

The system 10 may be a video-on-demand (VOD) type of multimedia data delivery system, and the media streams retrieved and delivered by the server 12 may correspond to MPEG-2 video streams configured in the manner described in ISO/IEC DIS 13818-1, "Information Technology-Generic Coding of Moving Pictures and Associated Audio Information: Systems," and ISO/IEC DIS 13818-2, "Information Technology-Generic Coding of Moving Pictures and Associated Audio Information: Video," both of which are incorporated herein by reference. The data streams may also correspond to other types of data configured on accordance with other data format standards, as well as various combinations of several different types of data configured in accordance with several different format standards.

An important characteristic of the media server 12 is the number N of data streams which can be simultaneously supported. Parameters which constrain the number of streams supported by the media server may include: (i) the disk seek time between retrieval of given portions of the data stream located on different disks or different zones of the same disk in the storage subsystem 14; (ii) the distribution of the data streams over the disks; (iii) the amount of data retrieved in each disk read access; (iv) the number of active streams supported by each disk; and (v) the disk retrieval bandwidth during data transfers from the disk to the server. These and other factors should be considered in the design of a media server.

The disk seek time will now be described in greater detail. Disk seeks generally have four major components including: (i) acceleration; (ii) constant velocity motion; (iii) deceleration; and (iv) head settle time. An average disk seek time may be computed by dividing the sum of the time taken for all possible seeks by the number of possible seeks. The worst case seek time generally corresponds to a seek across an entire disk. For longer seek times, the acceleration, deceleration and head settle time components can be considered a fixed overhead. Shorter seeks may include a smaller overhead because full acceleration is generally not required. The ratio of worst case seek time to average seek time may be on the order of 2:1. For example, the average seek time and maximum seek time of a Seagate ST32550 disk are on the order of 8.5 ms and 18 ms, respectively.

A number of factors influence the disk seek time and thereby the data delivery throughput of server 12. One factor is the position of the stored data on a given disk. A track near the outer edge of a disk is longer than one near the inner edge, such that outer tracks generally have a greater storage capacity than inner tracks. For example, the storage capacity of the above-noted Seagate ST32550 disk changes from 51,450 bytes per track to 74,900 bytes per track from the inner to the outer tracks. With a constant rotational velocity, the data delivery bandwidth obtainable from the outer tracks is therefore larger than that obtainable from the inner tracks. Another factor influencing the data delivery throughput of server 12 is the distribution of a given data stream over the disks of the storage subsystem 14. For example, stored video data streams are generally so large that there is little locality between disk access locations for different stored streams.

The amount of data transferred in each disk access also affects the server performance. For example, a Seagate ST31250 disk has a sequential read throughput of about 7 Mbits/s when the read block size is 100 Kbits to 500 Kbits, and a random access throughput of 4.8 Mbits/s for a block size of 500 Kbits and 2.8 Mbits/s for a block size of 100 Kbits. Sequential access retrieval thus generally has higher performance than random access retrieval, because only a single seek is required for sequential access.

The present invention provides a data placement technique and corresponding retrieval scheduling technique. These techniques permit a sequential-like retrieval which minimizes disk seeking time in a server supporting multiple simultaneous subscribers. This sequential-like retrieval avoids the previously-noted problems associated with interleaving data retrievals which tend to result in a random-like retrieval performance and thereby limit the total number of simultaneous subscribers. The present invention provides sequential-like retrieval for a large number of subscribers by separating or "stripping" the data streams into portions, and storing or "scattering" the portions on the disks of storage subsystem 14 in accordance with a predetermined sequence.

Figure 3:
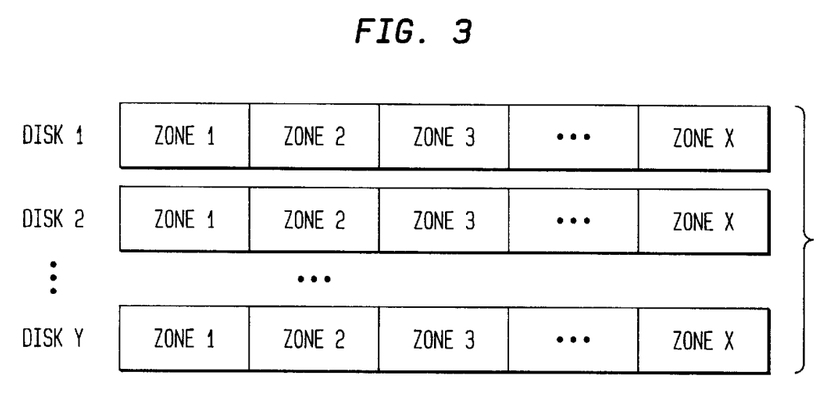
FIG. 3 illustrates the division of disks into zones in an exemplary disk-based storage medium suitable for use with the present invention.

FIG. 3 illustrates the manner in which a number Y of disks in the disk-based storage subsystem 14 are each separated into X zones in accordance with the present invention. The X zones of a given disk may each contain an equal amount of storage space, although it should be noted that this is not a requirement of the invention. The number of zones X per disk and the number of disks Y in the disk-based storage subsystem 14 are selected in accordance with the invention such that X and Y are relatively prime, that is, have no common factors greater than 1. For example, X may be selected to be Y+1, such that X and Y are relatively prime and each of the X zones has a size substantially equivalent to 1/X or 1/(Y+1) of the size of a given one of the Y disks. Alternatively, X may be selected to be Y−1, which will also provide relatively prime X and Y values. Any other suitable technique for selecting relatively prime X and Y values may also be used. In an exemplary implementation of system 10, the storage subsystem 14 may include 15 disks each having a storage capacity on the order of 2 to 8 Gbytes, and each divided into 16 zones of about 125 to 500 Mbytes each. It should be emphasized that each of the Y disks and each of the X zones of a given disk need not have the same storage capacities. For example, one of the Y disks may include more or less than X zones. At least a subset of the Y disks, however, should include approximately X zones as shown in FIG. 3. In addition, a given storage subsystem 14 may include more than Y disks, in which case the techniques of the present invention may be applied to a group of Y disks representing a subset of the total number of disks in the subsystem. Exemplary disk and zone arrangements suitable for use with the present invention are described in greater detail in the above-cited U.S. patent application Ser. No. 08/657,739 of Shiao-Li Tsao et al.

The data placement technique of the present invention "scatters" portions of a given data stream onto different disks and disk zones of the data storage subsystem 14. The technique utilizes a modulo indexing which avoids the need for a complicated table-based mapping and reduces disk seek time, and therefore provides significant advantages over the conventional data placement techniques previously described. Residual number theory specifies that if two relatively prime numbers p and q are residual bases, a selected number between 0 and p*q−1 can be reconstructed from the residual bases p and q. In a preferred embodiment of the present invention, the number of zones X and the number of disks Y are considered residual bases. As noted above, the number of zones X in each of the Y disks may be selected as equal to the number of disks Y plus one, that is X=Y+1. The two numbers X and Y are then relatively prime. The position of a given zone X can therefore be readily determined from the relatively prime residual bases X and Y without the need for a complicated table-based mapping. In accordance with the invention, each of a plurality of data streams are "stripped" or separated into strip blocks, and groups of strip blocks referred to herein as v_segs are then "scattered" or stored across Y disks and X zones such that the ith portion or v_seg of a given stream is stored in zone (i mod X) of disk (i mod Y). As will be described in greater detail below, this placement in conjunction with a retrieval scheduling technique permits a sequential-like parallel retrieval of the stored data streams.

As an example, consider a disk-based storage subsystem 14 which includes four disks indexed from 0 to 3 (i.e., Y=4), with each disk having five zones indexed from 0 to 4 (i.e., X=Y+1=5). In accordance with the above-described placement of the ith portion or v_seg of a given data stream into a <disk, zone> location computed in the form <(i mod Y), (i mod X)>, the portions or v_segs of the given stream are stored in the following <disk, zone> sequence: <0, 0>, <1, 1>, <2, 2>, <3, 3>, <0, 4>, <1, 0>, <2, 1>, <3, 2>, <0, 3>, . . . Alternative embodiments of the invention may offset this placement by an initial <disk, zone> value. In such an embodiment, the ith portion of a given stream is stored in a zone (i mod X+Z1) of disk (i mod Y+Y1), where Z1 and Y1 are an initial zone offset and an initial disk offset, respectively. For example, an initial <disk, zone> offset of <2, 1> applied to each element of the above-noted sequence produces the following corresponding sequence: <2, 1>, <3, 2>, <0, 3>, <1, 4>, <2, 0>, <3, 1>, <0, 2>, <1, 3>, <2, 4>, . . . The data placement technique of the present invention alternates zones on adjacent disks and in the transition from the last to the first disk continues the zone index in accordance with the next index in the cycle including the previous disk. The disks of the storage subsystem 14 are thereby organized as a fully integrated sequential storage device. Each media stream is separated into portions or v_segs and the portions are stored in the manner previously described.

Figure 4:
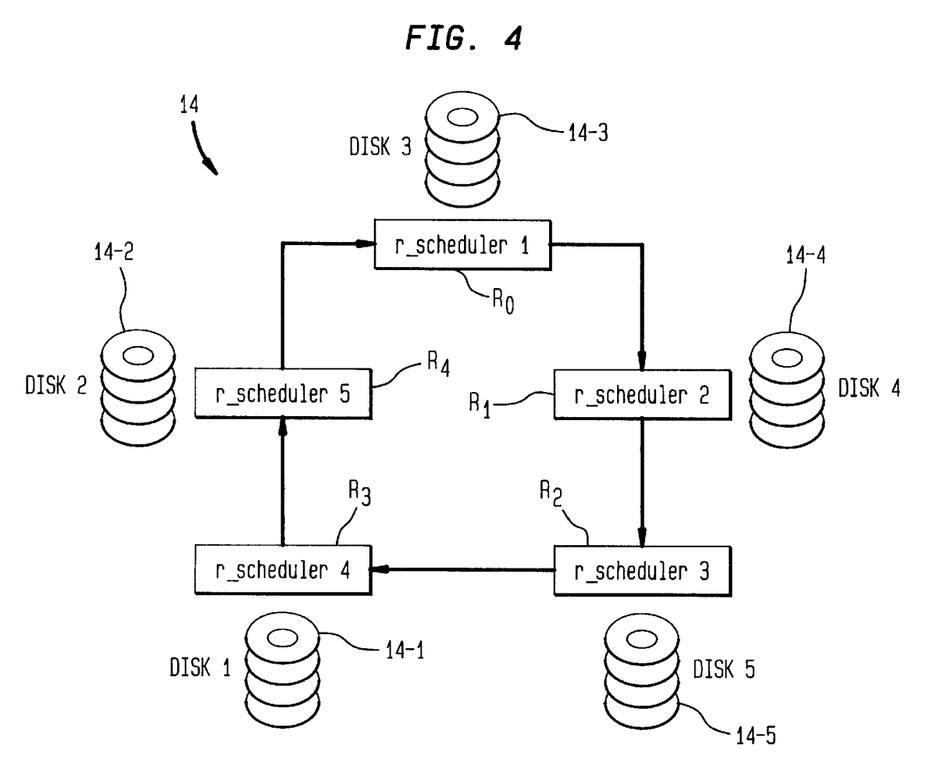
FIG. 4 is a block diagram illustrating a retrieval scheduling technique in accordance with an exemplary embodiment of the invention.

A media server in accordance with a preferred embodiment of the present invention also utilizes a retrieval scheduling technique illustrated in conjunction with FIGS. 4 and 5. The retrieval scheduling specifies a sequence of scheduling intervals, also referred to herein as rounds, during which data streams for all requesting clients are read from the disks of the storage subsystem 14. The data requested for a given stream in each scheduling interval is stored on the disks in one v_seg. Data streams with different bit rates will generally have different sized v_segs, but these different sized v_segs will typically correspond to the delivery time interval. The retrieval scheduling technique serves to parallelize the retrieval operation. In accordance with a preferred embodiment of the retrieval scheduling technique, each of the Y disks in the subsystem 14 utilizes a particular independent scheduler, referred to as an r_scheduler, during a given scheduling interval. A total of Y different r_schedulers are used for a storage subsystem with Y disks.

FIG. 4 illustrates the manner in which the Y different r_schedulers are circulated among different disks of the storage subsystem 14 for different scheduling periods in accordance with the invention. The exemplary storage subsystem 14 of FIG. 4 includes five disks 14-1 through 14-5. Five r_schedulers R0 through R4 are used to control the retrieval of requested data streams from the five disks 14-1 through 14-5. The r_schedulers are circulated among the disks over several scheduling intervals such that a given disk will utilize a different r_scheduler depending on the scheduling interval of the data retrieval process. For the scheduling interval corresponding to the r_scheduler assignment illustrated in FIG. 4, disk 14-1 is using r_scheduler R3, disk 14-2 is using r_scheduler R4, disk 14-3 is using r_scheduler R0, disk 14-4 is using r_scheduler R1, and disk 14-5 is using r_scheduler R2. As noted above, this assignment will change depending upon the scheduling interval, following the circulation pattern indicated by the arrows connecting the r-schedulers in FIG. 4. For example, during the next scheduling interval, disk 14-4 will use r_scheduler R0, disk 14-5 will use r_scheduler R1 and so on.

FIG. 5 illustrates the information provided by three exemplary r_schedulers R0, R1 and R2 suitable for use in a three-disk data storage subsystem over nine successive scheduling intervals T0 through T9. The r_schedulers organize data stream requests into groups that share access to the disks of the storage subsystem, and manage the disk retrieval bandwidth and access times. It can be seen that the requests in the exemplary r_schedulers of FIG. 5 have been organized into groups 0 through 11. If B represents the total bandwidth that can be accommodated by one disk in the media server 12, requests can be added to a given r_scheduler if all the current requests in that r_scheduler use a total bandwidth less than or equal to B. As noted above, the number of r_schedulers is equal to the number of disks in the storage subsystem 14, and the requests in a given r_scheduler access the same disk during a given scheduling interval. Within a given r_scheduler, the requests are divided into X groups, where all members of a group always access the same disk zone during a given scheduling interval. This arrangement ensures that the total retrieval bandwidth used by requests in each group may be maintained at approximately equal levels.

As a given r_scheduler circulates from disk to disk in the manner described in conjunction with FIG. 4 above, the particular disk zone accessible to each request changes in accordance with the r_scheduler plan. The use of the r_schedulers thus maintains the balance between zone accesses, while allowing every request to access all disk zones and to access the disks sequentially disk-by-disk. Within a given r_scheduler, the read requests for a given disk are ordered sequentially. At any given scheduling interval, only one r_scheduler will read data from a given disk assigned to that r_scheduler for that scheduling interval. When a new request arrives in the server 12, an admission policy in accordance with the invention attempts to place the new request in the r_scheduler that will next be assigned the disk containing the first block of the requested stream. If that r_scheduler is full, the admission policy scans backwards for an r_scheduler that will soon have access to the proper disk and zone and which has sufficient bandwidth for the new request.

A server in accordance with the invention will generally include a random access memory (RAM) buffer which should be configured to balance the retrieving rate and the consumption rate to thereby avoid the previously-described starvation problem. A simple method of buffer management suitable for use with the present invention could involve the provision of double buffers for each requested stream, with one of the buffers used to deliver requested streams to the clients while the other is filled with data retrieved from the disk. The starvation-avoidance condition for such a buffering technique is given by Rs>Rt, where Rs is the data transfer rate from the disk to the buffer and Rt is the data stream transmission or consumption rate from the buffer to the clients. The previously-described buffer-conserving requirement indicates that the required buffer size for each media stream should be at least $SB=Tacc*Rs*Rt/(Rs-Rt)$, where Tacc is the storage access time. From the equations Rs>Rt and $SB=Tacc*Rs*Rt/(Rs-Rt)$, the required buffer size SB for each stream can be determined. Because the above-described placement and retrieval techniques reduce the total disk access time to approximately an average seek time, the required buffer size is also significantly reduced. For example, if Tacc=8.5 ms, Rt=1.5 Mbits/s, and Rs=1.55 Mbits/s, the required buffer size SB is only about 50 Kbytes. The higher the media stream retrieval rate Rs, the smaller the required buffer size in the server 12.

It should be understood that the foregoing description is merely illustrative of the invention. Numerous alternative embodiments within the scope of the appended claims will be apparent to those of ordinary skill in the art.

The claimed invention is:

1. A method for retrieving requested multiple digital data streams from a multiple-disk storage system including Y>1 disks, each of the Y>1 disks having X>1 zones, the method comprising the steps of:

organizing data stream requests via R>1 schedulers, where R=Y, such that each scheduler corresponds to a given Y>1 disk during each scheduling interval, and each scheduler sequentially circulates to the next Y>1 disk after each scheduling interval, wherein said organizing places said data stream requests into groups that share disk access, each group corresponding to an individual R>1 scheduler, where all requests in a group access the same given Y>1 disk, such that each R>1 scheduler corresponding to a given Y>1 disk may accept requests into its group until the added usage of each request equals the total bandwidth of said given Y>1 disk.

2. The method of claim 1, wherein said data streams to be retrieved from said multiple disk storage system are stored, the method of storing comprising the steps of:

separating a given one of the multiple digital data streams into a plurality of portions; and storing an ith portion of the plurality of portions of the given data stream in a zone determined as a function of (i mod X) of a disk determined as a function of (i mod Y) of the multiple-disk storage system.

3. The method of claim 2 wherein the step of storing an ith portion of the given data stream further includes the step of storing the ith portion directly in a zone (i mod X) of a disk (i mod Y).

4. The method of claim 2 wherein the step of storing an ith portion of the given data stream further includes the step of storing the ith portion in a zone (i mod X+Z1) of disk (i mod Y+Y1) where Z1 and Y1 are an initial zone offset and an initial disk offset, respectively.

5. The method of claim 2 wherein the number of zones per disk X and the number of disks Y are relatively prime numbers.

6. The method of claim 5 wherein the number of zones per disk X is equivalent to the number of disks Y plus one.

7. The method of claim 1 wherein each R>1 scheduler is configured to provide an approximately equivalent retrieval bandwidth for each said request in said group processed by that scheduler.

8. The method of claim 1 further including the step of:

if said added usage equals the total bandwidth of a given Y>1 disk, scanning sequentially through the remaining R>1 schedulers until a scheduler is located having sufficient bandwidth to accommodate the additional request.

9. An apparatus for storing and retrieving multiple digital data streams, the apparatus comprising:

a multiple-disk storage system including Y>1 disks, each of the Y>1 disks having X>1 zones; and a server coupled to the multiple-disk storage system and operative to organize data stream requests via R>1 schedulers, where R=Y, such that each scheduler corresponds to a given Y>1 disk during each scheduling interval, and each scheduler sequentially circulates to the next Y>1 disk after each scheduling interval, wherein said organizing places said data stream requests into groups that share disk access, each group corresponding to an individual R>1 scheduler, where all requests in a group access the same given Y>1 disk, such that each R>1 scheduler corresponding to a given Y>1 disk may accept requests into its group until the added usage of each request equals the total bandwidth of said given Y>1 disk.

10. The apparatus of claim 9 wherein each R>1 scheduler is configured to provide an approximately equivalent retrieval bandwidth for each said request in said group processed by that scheduler.

11. The apparatus of claim 9 wherein the server is further operative, if said added usage equals the total bandwidth of a given Y>1 disk, to scan sequentially through the remaining R>1 schedulers until a scheduler is located having sufficient bandwidth to accommodate the additional request.

12. The apparatus of claim 9, wherein said server being further operable to separate a given one of the multiple digital data streams into a plurality of portions, and to store an ith portion of the plurality of portions of the given data stream in a zone determined as a function of (i mod X) of a disk determined as a function of (i mod Y) of the multiple-disk storage system.

13. The apparatus of claim 12 wherein the server is operative to store the ith portion directly in a zone (i mod X) of a disk (i mod Y).

14. The apparatus of claim 12 wherein the server is further operative to store the ith portion in a zone (i mod X+Z1) of a disk (i mod Y+Y1) where Z1 and Y1 are an initial zone offset and an initial disk offset, respectively.

15. The apparatus of claim 12 wherein the number of zones per disk X and the number of disks Y are relatively prime numbers.

16. The apparatus of claim 15 wherein the number of zones per disk X is equivalent to the number of disks Y plus one.

* * * * *